D. JENKINS.
LUBRICATOR.

No. 187,387. Patented Feb. 13, 1877.

Witnesses.
James K. Bakewell
James D. Kay

Inventor.
David Jenkins
by Bakewell & Kerr
Attys.

UNITED STATES PATENT OFFICE.

DAVID JENKINS, OF PITTSBURG, PENNSYLVANIA.

IMPROVEMENT IN LUBRICATORS.

Specification forming part of Letters Patent No. 187,387, dated February 13, 1877; application filed January 17, 1877.

*To all whom it may concern:*

Be it known that I, DAVID JENKINS, of Pittsburg, in the county of Allegheny and State of Pennsylvania, have invented a new and useful Improvement in Lubricators or Oil-Cups for Steam-Chests, Cylinders, &c.; and I do hereby declare the following to be a full, clear, and exact description thereof, reference being had to the accompanying drawing, forming part of this specification, in which—

Figure 1:
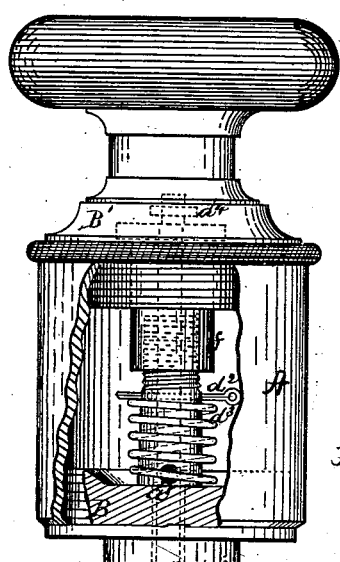
Figure 2:
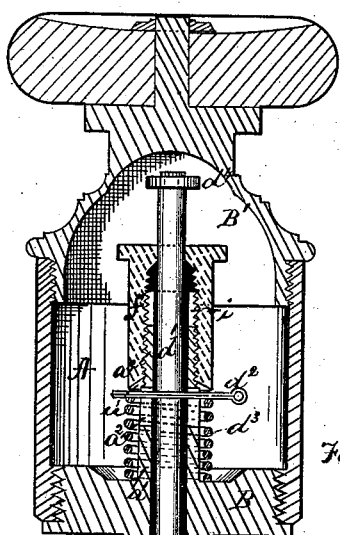
Figure 3:
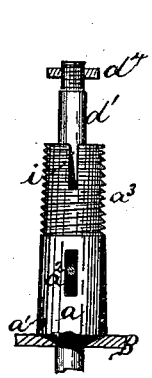

Figure 1 is an elevation, partly in section. Fig. 2 is a central vertical section of an oil-cup or lubricator embodying my invention. Fig. 3 is an enlarged view of the sleeve $a$.

Like letters refer to like parts wherever they occur.

My invention relates to that class of devices known as oil-cups or lubricators, and is especially adapted to supply a lubricant to such bearings as exist in steam chests, cylinders &c., where steam or other pressure and exhaust alternately occur.

The object of the present invention is to obtain a lubricator which can be made to deliver a continuous or intermittent supply of the lubricant at pleasure, and can be employed wherever intermittent pressure or vacuum is obtainable.

I will now proceed to describe my invention, so that others skilled in the art to which it appertains may apply the same.

In the drawing, A indicates the oil-cup of any suitable material, preferably closed above and below by screw-caps B B'. Upon the under side of cap B or base of the oil-cup is a sleeve, $b$, turned out or otherwise constructed to form a seat, $c$, for the automatic valve $d$, and threaded upon its outer surface, as at $e$, for connection with a hollow stem, C, by means of which the cup or lubricator is attached to a steam chest or cylinder. The stem C may be threaded at $c'$ in the usual manner, and is provided with a cock, D, for closing the passage leading from the lubricator to the chest or cylinder.

Within the cup, and secured to or formed with the base thereof, is a sleeve, $a$, through which rises the stem of valve $d$. This sleeve $a$ is perforated at its base, as at $a^1$, to permit the escape of the lubricant, is slotted at a point higher up ($a^2$) to permit the passage and play of a pin, which secures valve $d$, is threaded upon its upper end, as shown at $a^3$, to receive a threaded sleeve or jamb-nut, $f$, and is slightly split, as at $i$, to form a partial lock with the sleeve-nut $f$, and retain it in position. $d$ indicates the automatic valve, which seats upward against $c$, is provided with a stem, $d^1$, through which passes a pin, $d^2$, to secure the valve in position, and is held up by a spiral spring, $d^3$, within the cup. The upper end of valve-stem $d^1$ is threaded for the reception of a nut, $d^4$, which, with the nut or sleeve $f$, serves to regulate the play of valve $d$ or to lock it up against its seat when desired. $f$ represents a sleeve-nut, which screws upon sleeve or stand-pipe $a$, and which is screwed up on the sleeve $a$ to limit the rise and fall of stem $d^1$, or is turned down until it engages with pin $d^2$ of the valve-stem and compresses spring $d^3$ to force valve $d$ off its seat. In order to permit of the lower edge of sleeve $f$ passing below the threaded portion of the sleeve or stand-pipe $a$, a portion of the screw-thread in $f$ is cut away, as shown at $u$.

The operation of my devices, when placed on a steam check or cylinder, is as follows:

When an intermittent feed of the lubricant is desired, the sleeve $f$ is turned up until the distance between the top thereof and nut $d^4$ is equal to the distance the valve is required to move, which latter will determine the amount of lubricant fed down at each action of the valve. When the steam is on, or other upward pressure is exerted, the valve $d$ will remain upon its seat; but when the exhaust or vacuum occurs, the valve will fall, discharging the predetermined amount of lubricant into the chest.

When a continuous feed is desirable, the sleeve $f$ is turned down until its lower edge engages with pin $d^2$, compresses spring $d^3$, and forces valve $d$ the desired distance from its seat.

The advantages of my improved devices are the facility with which an intermittent or continuous feed may be obtained and the supply controlled or cut off at pleasure.

Having thus described my invention, what I claim, and desire to secure by Letters Patent, is—

1. In a lubricator or oil-cup of the class specified, the combination of the valve having a suitable stem provided with a lug or pin, with the slotted sleeve, the spring, and the screw-sleeve, substantially as specified.

2. The combination of the valve having a suitable stem, the nut $d^4$, and the screw-sleeve $f$, substantially as and for the purpose specified.

3. In a lubricator the combination of the sleeve $a$, threaded and split, substantially as specified, with the sleeve $f$, as and for the purpose set forth.

In testimony whereof I, the said DAVID JENKINS, have hereunto set my hand.

DAVID JENKINS.

Witnesses:
JAMES I. KAY,
F. W. RITTER, Jr.